United States Patent [19]

Bailey

[11] 4,175,606
[45] Nov. 27, 1979

[54] ASSEMBLY FOR MOUNTING TUBELESS TIRES

[75] Inventor: Clifford E. Bailey, 201 E. Ellis St., Jefferson City, Tenn. 37760

[73] Assignee: Clifford E. Bailey, Jefferson City, Tenn.

[21] Appl. No.: 791,734

[22] Filed: Apr. 28, 1977

[51] Int. Cl.² ............................................. B60C 7/24
[52] U.S. Cl. .................................. 152/399; 152/409; 152/410
[58] Field of Search ............... 152/409, 410, 406, 407, 152/405, 396, 397, 398, 399, 379.1, 365, 364, 363; 301/97, 63 D

[56] References Cited

U.S. PATENT DOCUMENTS

| 2,822,017 | 2/1958 | Herzegh | 152/406 |
| 3,195,605 | 7/1965 | Mayfield | 152/410 |
| 3,913,653 | 10/1975 | Veudier | 152/409 |
| 4,016,917 | 4/1977 | Victor | 152/400 |

FOREIGN PATENT DOCUMENTS 521240  3/1955  Italy ........................................ 152/409

Primary Examiner—L. J. Paperner
Assistant Examiner—Lawrence E. Williams
Attorney, Agent, or Firm—Pitts & Kesterson

[57] ABSTRACT

An assembly for mounting tubeless tires on tube type rims. The assembly includes a pair of cooperating annuluses that define respective seating surfaces each of which are adapted for receiving one of the companion beads of the tire. One of the annuluses is telescoped onto the rim and positioned adjacent the rim flange integrally formed with the rim proximate one of its axial end portions. A locking annulus secured to the opposite axial end portion of the rim is adapted for receiving the companion bead and can be readily secured to or removed from the rim for purposes of mounting or demounting the tubeless tire without forcing the beads over a flared flange. The locking annulus may be mounted on a variety of conventional tube type rims while maintaining the bead seating surface at a predetermined spaced location from the rim wall. A suitable pneumatic inner tube inserted in the tire serves to prevent air from escaping the confines of the tubeless tire which may have damaged sealing properties. In one embodiment, the annulus which serves to receive the tire bead positioned proximate the rim groove is secured in position by a conventional tube type locking flange or ring.

10 Claims, 13 Drawing Figures

ASSEMBLY FOR MOUNTING TUBELESS TIRES

This invention relates to a rim assembly and more particularly concerns an assembly for adapting conventional tube type wheel rims for receiving tubeless type tires.

Heavy duty tubeless tires of the type used in connection with hauling commercial loads, for example, include companion beads having a sloped base portion which is integrally formed with a sidewall portion also sloped with respect to the axis of the tire. The tires are customarily mounted on conventional tubeless type wheel rims having flanged portions provided with seating surfaces which serve to form a seal between the flanges and the tire beads. In this connection, the companion tire beads mate with the juxtaposed flanges and upon injecting pressurized air into the tubeless tire, the base portion and sidewall portions of the beads are forced into interengagement with their respective flanges, thereby forming a seal which assists in preventing pressurized air from escaping the confines of the cavity cooperatively defined by the interior wall of the tire and the wheel hub.

The tubeless tires are customarily mounted on tubeless type wheel hubs by forcing the tire beads over one of the flanges adjacent to one axial end portion of the hub with a tire tool or suitable tire hammer or with more modern but expensive tire mounting apparatuses. During such mounting or demounting operations, damage such as scarring of the bead may be occasioned which hinders or prevents the tire from forming a proper seal with a tube less tire flange. Pressurized air contained within the tire may then escape resulting in a rendering of the tire useless for conventional mounting purposes albeit the tire and tread are substantially unused. Moreover, during hauling operations the tire may strike a stone or other object in its path causing partial separation of the tire wall allowing air sealed within the tire to seep into the wall forming a ballooned portion which is especially susceptible to being punctured.

Heretofore, there has been no known assembly for reusing tubeless tires which have been damaged in a manner that prevents the tires from sealing pressurized air within the tire mounted on a conventional tubeless tire hub. Thus, upon scarring the bead of a tire or damaging it such that pressurized air cannot be contained therein, the tire must be discarded even though the tread is virtually undamaged or unworn.

It is, therefore, an object of the invention to provide an assembly adapted for recycling tubeless tires having damaged sealing properties.

Another object of the invention to provide an apparatus for mounting a conventional tubeless tire having an inner tube disposed therein on a conventional tube type tire wheel hub. It is another object of the invention to provide an assembly which will maintain the tire beads at a location spaced apart by a predetermined distance such that a selected surface area of the tread is exposed to a supporting surface. It is a further object of the invention to provide an assembly for mounting a tubeless type tire having a pneumatic inner tube disposed therein on a conventional tubeless type tire wheel rim which enhances the ease with which the tire may be mounted and removed.

Other objects and advantages of the present invention will become more apparent upon reading the detailed specification in conjunction with the drawings wherein.

Figure 1:
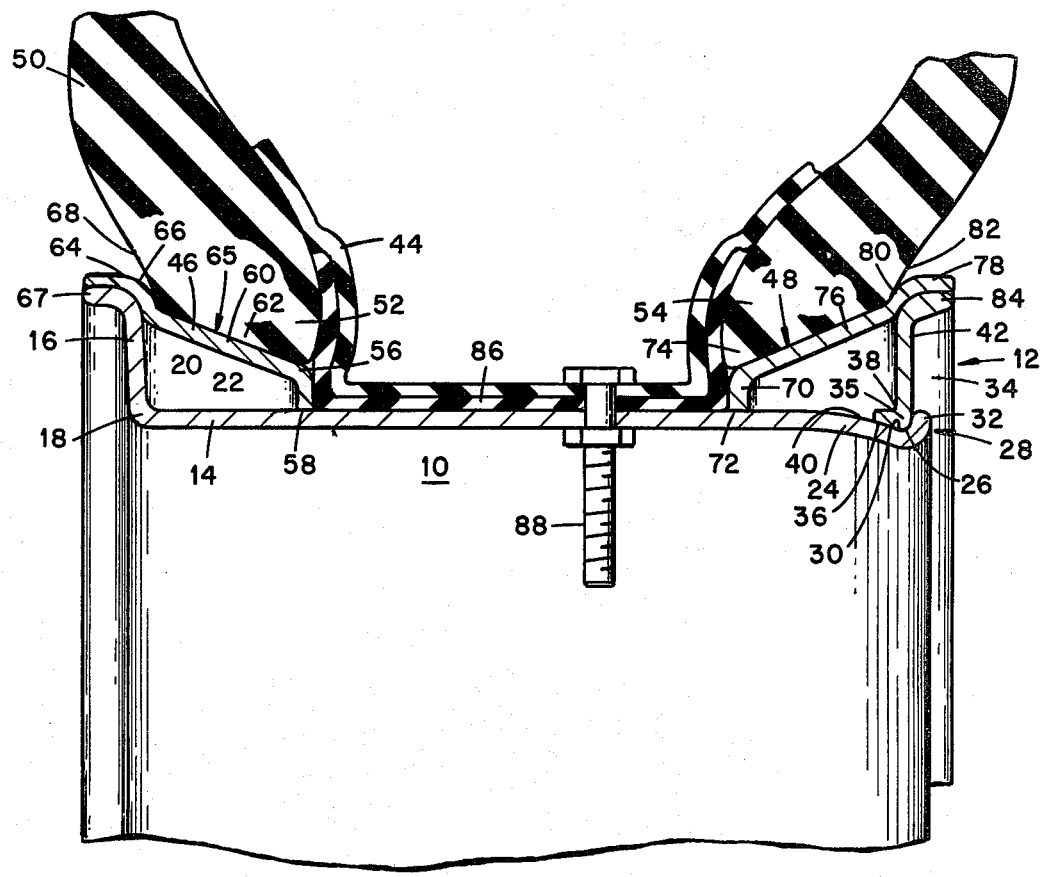
FIG. 1 is a partial sectional view of a rim assembly constructed in accordance with various features of the invention.

In accordance with various features of the invention there is provided an assembly for mounting tubeless type tires having a pneumatic inner tube disposed therein on a conventional tube type rim. The assembly in one embodiment includes a first annulus which is telescoped onto a conventional tube type rim and moved into engagement with a flange intergally formed with the hub at one of its axial end portions. A cooperating locking annulus is expandable and positioned proximate a circumferential groove offset from the opposite axis end portion of the rim upon being moved into register with the groove. Each of the annuluses include a seating surface adopted for receiving one of the tubeless tire beads. In one embodiment, the cooperating annulus is held into position proximate the opposite axial end of the hub by a conventional tube type tire locking ring. Moreover, the first annulus may be integrally found with the axial end of the rim opposite the locking annulus Referring now to the Figures, an assembly for mounting tubeless tires on a conventional tube type rim 10 is indicated generally at 12. The assembly 12 finds particular application in mounting tubeless type tires having slightly damaged sealing properties on a tube type rim for purposes of extending the useful life of the tire. A conventional tube type rim 10 is shown in FIG. 1 and includes a conventional cylindrical rim wall 14 having a first annular flange 16 integrally formed with the rim wall and projecting substantially radially from axial end 18 of the rim wall. This flange 16 defines a substantially upright surface 20 which extends approximately perpendicularly from the rim wall 14 and serves to engage the sidewall of the bead of a conventional tube type tire (not shown) to assist in preventing the tire from disengaging the rim. The innermost portion or bead seat (not shown) of a conventional tube type tire engages the portion 22 of the rim wall 14. The opposite end portion 24 of the rim wall 14 defines a circumferential groove 26 which is offset from the axial end 28 of the rim 10 by the shoulder 32. The illustrated groove 26 is substantially triangular in cross section, however the shape and proportion of the groove and the depth of its seat 32 terminating proximate the substantially upright shoulder 30 will vary depending on the manufacturer of the tire rim 10.

A locking flange 34 which is split and adapted for being expanded over the shoulder 30, includes a base portion 35 which defines a lower surface 36 that mates with the groove seat 32. Upper surface 38 of the base portion 34 cooperates with the portion 40 of the rim wall to support the companion bead seat of a conventional tire (not shown) with the upstanding wall 42 of the locking flange 34 serving to engage the side wall of the bead and to assist in preventing the tire from slipping off of the rim 10 during driving operations.

In order to adapt the rim 10 for receiving a tubeless tire having an inner tube 44 disposed therein, companion annuluses 46 and 48 are provided. More specifically, these annuluses 46 and 48 serve to increase the effective diameter of the rim 10 to match the internal diameter of the tubeless tire 50 and are adapted for mating with the beads 52 and 54, respectively, of the tubeless tire. In this connection, the first annulus 46 includes a substantially upright portion 56 which defines an innermost circumferential surface 58 that determines the internal diameter of the annulus and is proportioned for being telescoped onto the rim wall 14. This portion 56 of the annulus 46 is integrally formed with a sloped portion 60 that receives the base 62 of the bead 52 of the tubeless tire 50 and to this end, portion 60 of the annulus 46 is sloped approximately 20° with respect to the rim or tire axis. As necessary or desired, the slope of portion 60 of the annulus 46 may be sloped at a different angle, normally between about 5° and 25° to mate with the bead base 62.

Portion 60 of the annulus 46 terminates in an arcuate annulus portion 64 which includes a sloped section 66 forming an obtuse angle with respect to portion 60 of the annulus and engages the side wall 68 of the bead 52 to assist in preventing the bead from sliding off of the annulus 46. The arcuate portion 64 and the sloped portion 60 of the annulus define the bead supporting or seating surface 65. The annulus portion 64 engages the sloped section 66 of the flange 16, and as shown in FIG. 1 portion 64 of the annulus and section 67 of the flange 16 mate. The weight carried by the tire bead 52 is transmitted to the rim flange section 67, inasmuch as surface 58 may be spaced slightly from the rim wall 14 to facilitate telescoping the annulus onto the rim. As necessary or desired, however, the internal diameter of the annulus 46 as defined by the surface 58 may engage the rim wall 14 such that the weight carried by the tire bead 52 is transmitted to the flange 16 through the annulus portion 64 and to the rim wall 14 through the surface 58 subsequent to slight flexing of the annulus 46 responsive to the weight carried by the bead 52, i.e., the distributed weight of a truck and its load, being transmitted to the annulus.

Similarly, the further annulus 48 includes a substantially upright portion 70 which defines an innermost circumferential surface 72 that determines the internal diameter of the annulus and is proportioned for being telescoped onto the rim wall 14 over end 28 thereof. This portion 70 of the annulus 48 is integrally formed with a sloped portion 76 that receives the base 74 of the bead 54 of the tubeless tire 50 and to this end, portion 76 of the annulus 48 is sloped approximately 20° with respect to the rim or tire axis. As necessary or desired, the slope of portion 76 of the annulus 48 may be sloped at a different angle, normally between 5° and 25° to mate with the bead base 74.

Portion 76 of the annulus 48 terminates in an arcuate annulus portion 78 which includes a sloped section 80 forming an obtuse angle with respect to portion 76 of the annulus which engages the side wall 82 of the bead 54 and prevents the bead from sliding off of the annulus 48. The annulus portion 78 engages the uppermost section 84 of the locking flange 34, and as shown in FIG. 1, portion 78 of the annulus 48 and section 84 of the flange 34 mate and the weight carried by the tire bead 54 is transmitted to the rim flange portion 84, inasmuch as surface 72 may be spaced slightly from rim wall 14 to facilitate telescoping the annulus onto the rim. As necessary or desired, however, the internal diameter of the annulus 48 as defined by the surface 72 may engage the rim wall 14 such that the weight carried by the tire bead 54 is transmitted to the locking flange 34 through the annulus portion 78 and to the rim wall 14 through the surface 72 subsequent to slight flexing of the annulus 48 responsive to the weight carried by the bead 54, i.e., the distributed weight of a truck and its load, being transmitted to the annulus.

It will be recognized that the sloped portion 60 and 64 and the area of annulus 46 and the portions 76 and 78 of annulus 48 define seating surfaces which supportably engage the tubeless tire bead and maintain the bead at a spaced location from the rim 10. In this connection, the mounting and demounting of the tire is facilitated inasmuch as the bead does not frictionally engage the rim wall 14 during mounting and demounting and it is not necessary to force the bead over a rim flange in order to mount or remove the tire. Moreover, the tire 50 can be used even though its sealing properties have been damaged since the inner tube 44 serves to prevent the air from escaping. A liner 86 interposed between the tube 44 and the rim wall 14 assist in preventing a puncture of the inner tube. A valve 88 serves to introduce pressurized air into the tube subsequent to its being mounted on the rim assembly 12.

Figure 2:
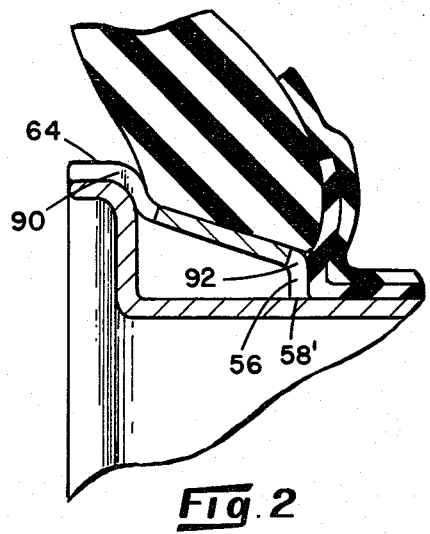
FIG. 2 is a partial sectional view of an alternate annulus adapted for mounting a tubeless tire on a tube type rim.
Figure 3:
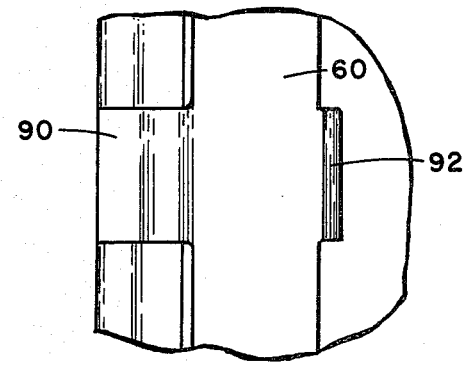
FIG. 3 is a plan view of a section of the annulus shown in FIG. 2.

In an alternate embodiment, annuluses 46 and 48 may be provided with a plurality of tangs which serve to engage the conventional flanges and also guide the annuluses onto the rim. More specifically, the sections 56 and 64 of the annulus 46, for example, comprise a plurality of annularly spaced tangs 90 and 92 respectively. Tangs 90 engage the flange section 66 at annularly spaced locations, and tangs 92 define a surface 58' which engages the rim wall 14 at annularly spaced locations. The annuluses including the tangs as shown in FIGS. 2 and 3 may be used in light weight vehicles or the like in which it is not necessary for the weight of the vehicle to be evenly distributed about the rim perimeter. For example, in certain farm equipment, such as insect spraying machines which move at a slow rate of speed it is not necessary for the vehicle weight to be carried continuously about the rim. It will be recognized that the annuluses shown in FIGS. 2 and 3 will include less metal stock and weigh less if fabricated from the same metal than the annuluses shown in FIG. 1.

In accordance with a feature of the assembly 12, a locking annulus 94 is provided which serves to support the tubeless tire bead 54 adjacent the groove 26 at substantially the same radial displacement from the rim wall 14 as the bead 52. More specifically, the locking annulus 94 is adapted for use in connection with a variety of conventional rims regardless of the shape of the offset circumferential groove 26. The illustrated locking annulus 94 is fabricated from a suitable rigid material such as mild steel, aluminum or the like which is split in order to enable expanding the locking annulus over shoulder 30 at end 28 of the rim for purposes of moving the annulus into engagement with the groove 26.

In order to assist in adapting the illustrated annulus 94 for being mounted on conventional rims having varying shaped grooves 26 the lower portion 96 of the annulus is provided with a recessed circumferential shoulder 98 which is proportioned for mating with the rim shoulder 30 proximate the end 28 of the rim wall. This annulus shoulder 98 rests on the rim shoulder 30 upon fitting the annulus on the rim for supporting the companion bead 54 of the tubeless tire and controls the radial position with respect to the axis of the rim at which the tire bead 54 is held.

The locking annulus 94 defines a seating surface 100 which includes a first sloped portion 102 which is proportioned and adapted for mating with the bead base 74. In the embodiment illustrated in FIG. 4 the sloped portion 102 of the seating surface engages only a portion of the bead base 74 and section 104 of the bead base overhangs edge 106 of the sloped portion 102. It has been found that adequate support is provided for the bead base 74 by supporting only a portion thereof, however, as necessary or desired the sloped surface 102 may be elongated for purposes of engaging the entire width of the bead seat.

Sloped portion 102 of the locking annulus terminates at its marginal end 108 in an arcuate portion 110 including a sloped section 112 which is disposed at an obtuse angle with respect to the sloped portion 102 of the annulus. This arcuate portion serves to engage the side wall 82 of the bead and assists in preventing the bead from moving axially outwardly from the rim upon introduction of pressurized air into the tire inner tube 44 through valve 88.

The circumferential shoulder 98 which rests upon the rim shoulder 32 serves to adapt the locking annulus 94 for use in conjunction with a variety of conventional tube type rims. In this connection, the shoulder serves to control the depth at which the locking annulus 94 is received in the circumferential groove 26 thereby maintaining the bead supporting or seating surface 100 at a predetermined level which is substantially identical to the level at which the companion supporting surface 65 of annulus 46 maintains the companion bead 52. In certain conventional locking flange arrangements, the radial position of the supporting surface is determined by the lower portion of the annulus which rests against the base of the groove 26. Inasmuch as the rim grooves 26 may vary in size and shape the supporting surface 100 for the bead 52 may have a different radial position with respect to the rim wall 14 if the locking annuluses are interchanged between rims produced by different tire manufacturers. The shoulder 98 assists in overcoming this problem and the annulus 94 may be used on a variety of conventional rims while maintaining the seating surface 100 at a predetermined location.

Figure 5:
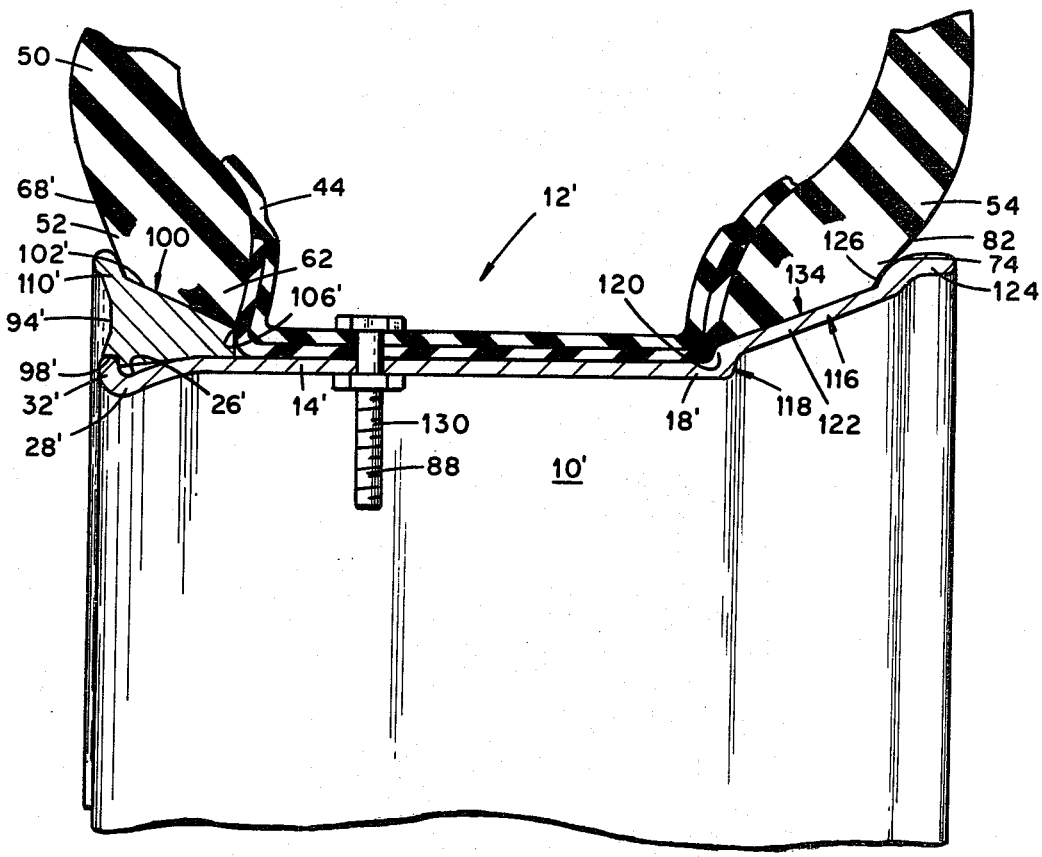
FIG. 5 is a partial sectional view of the rim assembly having a locking annulus similar to the annulus shown in FIG. 4 and an opposed annulus integrally formed with the hub.

A modified assembly for mounting a tubeless tire 50 on a tube type rim is indicated generally at 12' in FIG. 5. The assembly 12' includes a rim 10' which may be fabricated as a single unit or from a modified conventional rim. More specifically, the rim 10' shown in FIG. 5 includes a cylindrical rim wall 14' having an annular flange 116 integrally formed with the rim wall 14' at axial end 18' of the rim. This flange 116 may be welded onto the cylindrical wall 14' of a conventional rim after removing the conventional upright standing annular flange commonly associated with a conventional tube type rim assembly. The illustrated flange 116 is welded along its end portion 118 to the axial end 18' of the rim 10' and includes a substantially upright portion 120 which terminates in a sloped portion 122 proportioned for receiving the bead base 74 of a conventional tubeless type tire 50. As discussed hereinabove in connection with the annulus 46 the sloped portion 122 of the flange 116 forms an angle of approximately 5 degrees to 25 degrees with respect to the axis of the rim 10' for purposes of mating with the bead base 74. This sloped portion 122 of the flange terminates in an arcuate portion 124 having a sloped section 126 which engages the side wall 82 of the bead 54 and assists in preventing axial movement of the bead with respect to the flange 116 thereby confining the bead to the seating surface 134 upon introduction of pressurized air into the inner tube 44 disposed within the tubeless tire 50. In this connection air may be selectively introduced or removed from the inner tube for purposes of inflating the tire through a conventional valve 88' having a valve stem 130 extending radially inwardly from the inner tube 44 toward the rim axis.

Figure 4:
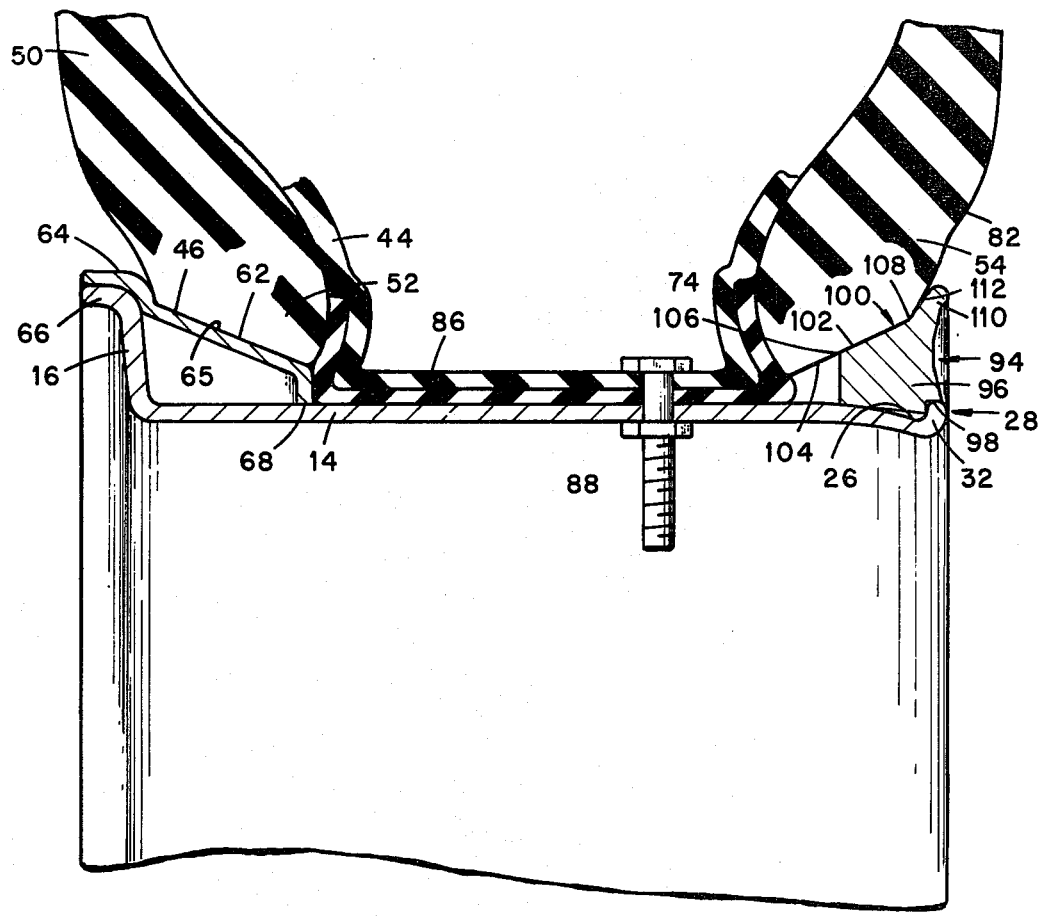
FIG. 4 is a partial sectional view of an alternate locking annulus substituted in FIG. 1.

The companion bead 52 of the tubeless tire 50 shown in FIG. 5 is supported at the opposite axial end 28' of the rim 10' by a locking annulus 94' which is substantially identical to the locking annulus 94 shown in FIG. 4, and for this reason prime numerals are used to cross reference various portions of the two annuluses 94 and 94'. The locking annulus 94' shown in FIG. 5 includes a seating surface 100' which is defined by the sloped portion 102' of the annulus 94' which mates with the bead base or seat 62. The illustrated sloped section or surface 102' is proportioned for carrying substantially all of the bead seat 62' such that bead seat 62' does not overhang edge 106' of the sloped surface 102'. As described in greater detail herein above this sloped surface 102' may be adapted for receiving only a portion of the bead seat 62' without hindering the effectiveness of the assembly 12'. Arcuate portion 110' of the annulus 94' serve to engage the sidewall 68 of the bead 52 and assists in preventing axially outwardly movement of the bead with respect to the rim axis thereby retaining the tire 50 on the rim during operation of the assembly. Shoulder 98' of the annulus 94' serves to engage the rim shoulder 32' proximate the groove 26' thereby positioning the seating surface 100' at substantially the same radial position as the companion seating surface 134 such that the threads or surface of the tire (not shown) engages a supporting surface substantially in a predetermined manner, i.e., the tire is kept in round.

An alternate locking annulus 140 is shown in FIGS. 6–9 for supporting one bead of a tubeless type tire, the companion bead being supported by the annulus 46 described in greater detail hereinabove. The illustrated locking annulus 140 includes a substantially upright portion 146 which defines an annular surface 148 at its innermost portion which is adapted for mating with the base of a circumferential groove 26" offset from axial end 28" of the rim 10". This upright portion 146 terminates in a sloped portion 150 which is proportioned for receiving the base of a tubeless tire bead. The sloped portion 150 of the annulus 140 terminates in an arcuate portion 152 which assists in preventing outwardly axial movement of the tire bead positioned or carried by the bead seating surface 154 defined by the sloped portion 150 and the arcuate portion 152 which is integrally formed therewith. The companion annulus 46 positioned at the opposite axial end 18" of the rim 10" serves to receive the companion tire bead (not shown) and in this connection includes a bead seating surface 65 disposed at a radial position substantially identical to the radial position of the bead seating surface 154 of the locking annulus 140.

In order to facilitate mounting and demounting of the annulus 140 on the rim 10", a slit 156 (exaggerated in FIGS. 7 and 9 for purposes of clarity) is provided in the annulus wall. This slit 156 assists in expanding the annulus 140 for purposes of moving portion 146 of the annulus into register with the circumferential groove 26". The surface 148 engages the base of the groove in the illustrated embodiment, however as necessary or desired the annulus 140 may be provided with a suitable shoulder for resting against the rim shoulder 32" to provide a universal fit for various rims having grooves of varying sizes and shapes.

Figure 6:
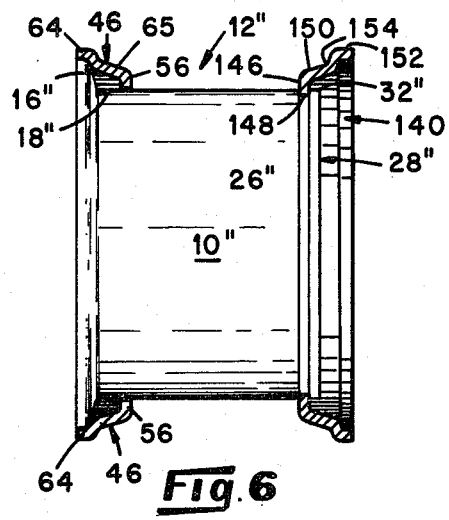
FIG. 6 is an elevation view of an assembly with the annuluses partially broken away.
Figure 7:
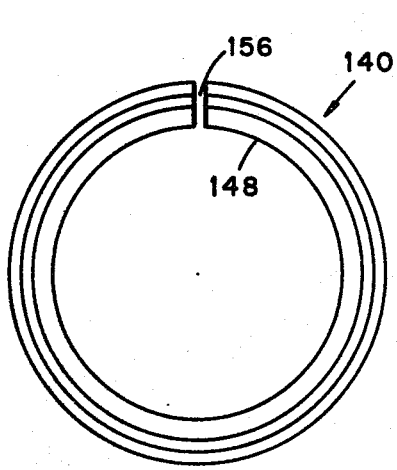
FIG. 7 is a front view of the locking annulus shown in FIG. 6.
Figure 8:
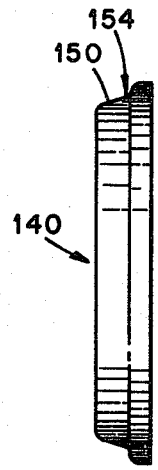
FIG. 8 is a side view of the locking annulus shown in FIG. 7.
Figure 9:
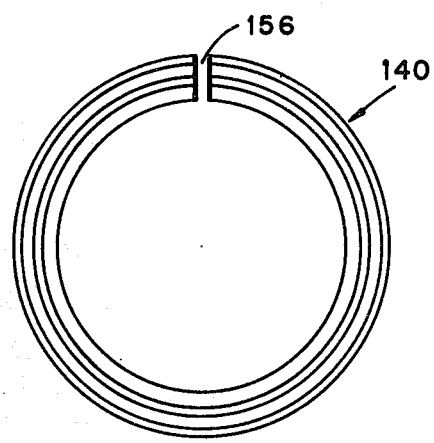
FIG. 9 is a rear view of the locking annulus shown in FIG. 7.
Figure 10:
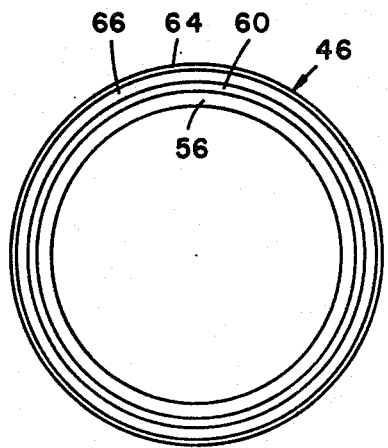
FIG. 10 is a front view of the annulus shown in FIGS. 1 and 6.
Figure 11:
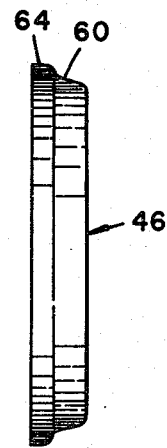
FIG. 11 is a side view of the annulus shown in FIG. 10.
Figure 12:
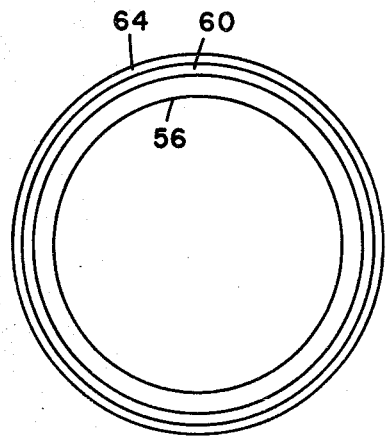
FIG. 12 is a rear view of the annulus shown in FIG. 10.

As shown in FIG. 6, a portion of the bead seating surface 154 is disposed outwardly from the axial end 28 of the rim 10" such that the effective length of the rim assembly is increased thereby increasing the spacing between the companion beads of a tubeless tire carried by the assembly 12". In this connection the surface or treads of the tire which engage the ground will be positioned such that the outer edges of the tire will be subjected to greater wear. Similarly, the annulus pairs as shown mounted as in FIGS. 1, 4 and 5 serve to decrease the effective length of the rim which will subject the central portion of the tread to greater wear inasmuch as the surface of the tire exposed to a supporting surface will be bowed outwardly along its central portion.

It will be recognized that by using annulus pairs having preselected dimensions, a tubeless tire can be mounted on a rim such that a predetermined surface area of the tread will be exposed to greater wear. Thus, by increasing or decreasing the effective length of the rim with preselected annuluses the wear of the tire can be adjusted to maximize the useful life of the recycled tire. For example, if a recycled tubeless tire has edges which are worn more than the center portion of the tread, the effective length of the rim can be adjusted such that central portion of the tire is bowed outwardly slightly thereby subjecting the best portion of the tire to the most wear.

Figure 5A:
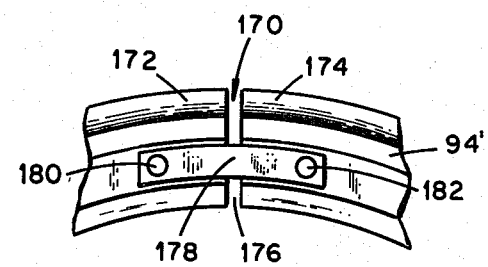
FIG. 5a is one embodiment of a lock to assist in preventing accidental disengagement between the locking annulus and the rim.

In order to assist in preventing the various locking annuluses from disengaging their respective rims during driving operations in which the tire 50 rolls over a supporting surface locking means is provided. One example of suitable locking means is indicated generally at 170 in FIG. 5a and mounted on the locking annulus 94'. The illustrated locking means 170 serves to join ends 172 and 174 of the annulus proximate the slit 176 which assists in enabling expansion of the annulus 94' for mounting and demounting the annulus on the rim. It will be recognized that each of the various locking annuluses shown in the Figures will be provided with a slit for purposes of expanding the on the rim.

The illustrated locking means 170 includes a plate 178 which is secured to the opposite ends 172 and 174 of the locking annulus 94' by suitable bolts 180 and 182, respectively, which are partially received in internally threaded bores provided in the opposed ends of the annulus 94'. One or both of the bolts may be removed for purposes of expanding the annulus 94'. It will be recognized that alternate means may be utilized for securing the plate to the opposite ends of the annulus, for example one end of the plate may be pivotally mounted on one end of the annulus, with the opposite end of the plate shaped to form a hook which may be selectively moved into and out of engagement with a suitable stud mounted at the oposite end of the annulus.

From the foregoing detailed description it will be recognized that the present invention incorporates certain advantages over prior art assemblies for mounting tubeless type tires. More specifically, the disclosed assembly particularly adapts utilization of tubeless tires having damaged sealing properties. In this connection, a pneumatic inner tube is disposed within the tubeless tire and suitable annuluses are mounted on a tube type rim for purposes of adapting the effective diameter rim for receiving the tubeless tire beads. Each of the annuluses are provided with a seating surface which serves to mate with and carry an associated juxtaposed tubeless bead. In one embodiment a locking annulus is provided which may be used with conventional tube type rims inasmuch as the radial position of the locking annulus seating surface is independent of the shape and depth of the circumferential groove offset from one axial end portion of a conventional tube type rim. In this connection, a shoulder is provided which to rests on the rim shoulder for purposes of positioning the annulus seating surface at a predetermined position.

By supportably engaging the tubeless tire bead at a location spaced from the rim wall, mounting and demounting of the tubeless tire rim is facilitated since the tire beads can be secured to the rim without forcing the beads, as with a tire tool, over a flange. Moreover, the annuluses serve to alter the effective length of the rim such that the tire beads are maintained at a spaced location such that the effective width of the tread which engages the supporting surface may be varied for purposes of exposing the best portion of the tread to the supporting surface thereby increasing the useful life of the tire.

While a preferred embodiment has been shown and described, it will be understood that there is no intention to limit the invention by such disclosure, but rather, it is intended to cover all modifications and all alternate constructions falling within the spirit and scope of the invention as defined in the appended claims.

What is claimed is:

1. In an apparatus for mounting tube type tires on a conventional wheel rim having a substantially cylindrical wall, said rim wall including a first annular flange integrally formed with said rim wall and radially projecting from the first axial end portion thereof, said rim wall defining at its opposite axial end, a circumferential groove offset from said further end of said rim wall by a shoulder, an assembly for mounting a tubeless type tire having a pneumatic inner tube disposed therein, said tubeless tire including companion beads, each of said beads having a sloped base integrally formed with said wall of said bead, said assembly including: a first annulus having an internal diameter substantially equivalent to the external diameter of said cylindrical rim wall whereby said first annulus can be telescoped on said rim and moved into engagement with said first annular flange, said first annulus defining a seating surface for receiving one bead of said tubeless tire, and a further annulus having an internal diameter substantially equivalent to the external diameter of said cylindrical rim wall, whereby said further annulus can be telescoped onto said cylindrical rim wall at said opposite axial end of said rim wall to a position inwardly of said circumferential groove, said further annulus defining a seating surface for receiving the companion bead of said tubeless tire, and annulus locking means having an internal diameter less than the external diameter of said cylindrical rim wall, said annulus locking means being split and adapted for being expanded over said rim wall shoulder and for seating in said circumferential groove such that said locking annulus means lockingly engages said opposite axial end of said rim thereby preventing movement of said further annulus axially outwardly of said rim.

2. The assembly of claim 1 wherein said further annulus is split and wherein said annulus locking means is integrally formed with said further annulus to form a split combination annulus, such that said split combination annulus can be expanded over said rim wall shoulder.

3. The assembly of claim 2 wherein said split combination annulus includes a shoulder which rests on said rim shoulder whereby the engagement of said rim shoulder and said combination shoulder serves to position the seating surface of said further combination annulus at a predetermined location.

4. The assembly of claim 1 wherein said seating surfaces of said first and further annuluses each include a first sloped portion disposed at an acute angle with respect to the axis of said rim, said first sloped portion of said seating surface mating with the base of said tubeless tire bead, and a further sloped portion integrally formed with said first sloped portion for mating with the side wall of one of said beads, said further sloped portion including at least one length forming an obtuse angle with said first sloped section.

5. The annuluses of claim 4 wherein said further sloped portion comprises a plurality of annularly spaced tangs adapted for engaging said first annular flange integrally formed with said rim wall.

6. The assembly of claim 1 including a locking plate mounted on said annulus locking means, said locking plate transversing said split and secured at its opposite ends to said annulus locking means on opposite sides of said split.

7. The assembly of claim 1 wherein said annulus locking means is a locking flange comprising a base portion for seating in said circumferential groove and a further portion having a diameter larger than the external diameter of said cylindrical rim wall for engaging said further annulus.

8. An assembly for mounting tubeless type tires on a wheel rim having a substantially cylindrical wall, said rim having opposite axial ends and including an annular flange at one of its axial ends, said flange defining a seating surface for receiving one bead of said tubeless tire, and a further annulus having an internal diameter substantially equivalent to the external diameter of the rim wall whereby said further annulus can be telescoped onto said cylindrical rim wall at said opposite axial end of said rim wall to a position inwardly of said opposite axial end, said further annulus defining a seating surface for receiving the companion bead of said tubeless tire, and a split annulus locking means for telescoping onto said cylindrical wall and for lockingly engaging said opposite axial end of said rim thereby preventing movement of said further annulus axially outwardly of said rim.

9. The assembly of claim 8 wherein the axial end of said rim opposite said flange defines a circumferential groove offset from said opposite end of said rim wall by a shoulder, said further annulus being integrally formed with said split annulus locking means to form a split combination annulus including a shoulder which rests on said rim shoulder whereby the engagement of said split combination annulus shoulder and said rim shoulder serves to position the seating surface of said locking annulus at a predetermined location.

10. The assembly of claim 9 including a locking plate mounted on said annulus locking means, said locking plate transversing said split and secured at its opposite ends to said annulus locking means on opposite sides of said split.

* * * * *